(12) United States Patent
Zuerner

(10) Patent No.: US 9,674,161 B2
(45) Date of Patent: Jun. 6, 2017

(54) DATA EXCHANGE IN THE INTERNET OF THINGS

(71) Applicant: Verizon Deutschland GmbH, Frankfurt am Main (DE)

(72) Inventor: Helmut Zuerner, Dortmund (DE)

(73) Assignee: Verizon Deutschland GmbH, Frankfurt (DE)

(*) Notice: Subject to any disclaimer, the term of this patent is extended or adjusted under 35 U.S.C. 154(b) by 0 days.

(21) Appl. No.: 15/338,756

(22) Filed: Oct. 31, 2016

(65) Prior Publication Data
US 2017/0048060 A1 Feb. 16, 2017

Related U.S. Application Data

(62) Division of application No. 14/305,303, filed on Jun. 16, 2014, now Pat. No. 9,509,664.

(51) Int. Cl.
*H04L 29/06* (2006.01)
*H04L 9/06* (2006.01)
*H04L 9/32* (2006.01)
*H04L 29/08* (2006.01)

(52) U.S. Cl.
CPC ........ *H04L 63/0428* (2013.01); *H04L 9/0643* (2013.01); *H04L 9/3236* (2013.01); *H04L 9/3247* (2013.01); *H04L 67/12* (2013.01)

(58) Field of Classification Search
CPC ..... H04L 67/12; H04L 9/3247; H04L 9/3236; H04L 9/064; H04L 63/12; H04L 63/0428
See application file for complete search history.

(56) References Cited

U.S. PATENT DOCUMENTS

| 8,326,651 B2 * | 12/2012 | McLaren ............. G06F 19/322 600/300 |
| 8,364,808 B2 * | 1/2013 | Shima .................... H04L 41/04 709/203 |
| 8,898,482 B2 | 11/2014 | Templin |
| 2002/0034305 A1 | 3/2002 | Noyama |

(Continued)

OTHER PUBLICATIONS

Zuerner, "The Internet of Things as Greenfield Model—A categorization attempt for labeling smart devices", 2014 IEEE World Forum on Internet of Things (WF-IoT), Mar. 6-8, 2014, 5 pages.

(Continued)

*Primary Examiner* — Hadi Armouche
*Assistant Examiner* — Sher A Khan

(57) ABSTRACT

A device is configured to store a hash value and an encrypted hash value. The device may broadcast a boot label including the encrypted hash value. The device may receive an administrator label from an administrative device based on the boot label. The administrator label may include a decrypted hash value. The device may determine the decrypted hash value matches the hash value. The device may receive access information from the administrative device based on the decrypted hash value matching the hash value. The access information may associate authorization information and an access level. The access level may be associated with particular data that is permitted to be read from the device. The device may selectively provide the particular data to a control device based on the access information.

20 Claims, 10 Drawing Sheets

(56) References Cited

U.S. PATENT DOCUMENTS

| | | | |
|---|---|---|---|
| 2004/0187012 A1* | 9/2004 | Kohiyama | G06F 11/1458 713/193 |
| 2004/0267572 A1* | 12/2004 | Emery | G06Q 10/1095 705/2 |
| 2005/0216559 A1 | 9/2005 | Manion | |
| 2011/0145894 A1* | 6/2011 | Garcia Morchon | G06F 19/3412 726/4 |
| 2013/0047233 A1* | 2/2013 | Fisk | G06F 21/6245 726/7 |
| 2013/0151852 A1* | 6/2013 | Bian | H04L 9/321 713/168 |
| 2013/0311570 A1* | 11/2013 | Kuo | H04W 4/008 709/204 |
| 2014/0195615 A1* | 7/2014 | Kuo | H04L 67/104 709/204 |
| 2014/0351592 A1* | 11/2014 | Starsinic | H04L 63/0876 713/168 |
| 2015/0113599 A1 | 4/2015 | Curtis | |
| 2015/0163056 A1 | 6/2015 | Nix | |
| 2015/0229654 A1 | 8/2015 | Perier | |
| 2015/0229726 A1* | 8/2015 | Jimenez | H04W 4/005 709/227 |
| 2015/0249663 A1* | 9/2015 | Svigals | H04L 63/0853 726/7 |
| 2016/0087946 A1* | 3/2016 | Yang | G06F 21/62 713/171 |

OTHER PUBLICATIONS

Lingg et al., "Cardea: Cloud Based Employee Health and Wellness—Integrated Wellness Application with a Wearable Device and the HCM Data Store", 2014 IEEE World Forum on Internet of Things (WF-IoT), Mar. 6-8, 2014, 6 pages.

Lingg, et al., "Cardea: Cloud Based Employee Health and Wellness—Integrated Wellness Application with a Wearable Device and the HCM Data Store", 2014 IEEE World Forum on Internet of Things (WF-IoT), Mar. 6-8, 2014, 6 pages.

* cited by examiner

DATA EXCHANGE IN THE INTERNET OF THINGS

RELATED APPLICATION

This application is a divisional of U.S. patent application Ser. No. 14/305,303, filed Jun. 16, 2014, which is incorporated herein by reference.

BACKGROUND

The Internet of Things (IoT) may be thought of as network of smart devices having identifiable virtual representations. Every smart device capable of communicating may be seen as part of the IoT. In the future, the IoT is expected to grow as smart devices become more common in everyday use. Accordingly, the IoT is expected to become more dynamic and more complex as more data is gathered from smart devices.

DETAILED DESCRIPTION OF PREFERRED EMBODIMENTS

The following detailed description of example implementations refers to the accompanying drawings. The same reference numbers in different drawings may identify the same or similar elements.

An owner or operator of a smart device may be willing to share or transfer data generated by the smart device with people, companies, or devices if there is some compensation and/or privilege granted to the owner or operator for sharing the data. For example, an owner may sell personal data to an interested company or use the data to pay a toll at a toll both. However, the data must be transferred from the smart device in a secure manner that only allows the data to be transferred to authorized devices and/or in an authorized manner.

Implementations described herein may allow a smart device to selectively send data to a central control device based on an IoT label. Additionally, or alternatively, a central control device may compile data from multiple smart devices to be associated with a realm (e.g., settings, parameters, and/or conditions for providing data to another device) and securely send the compiled data to other devices based on a realm hash value.

Figure 1A:
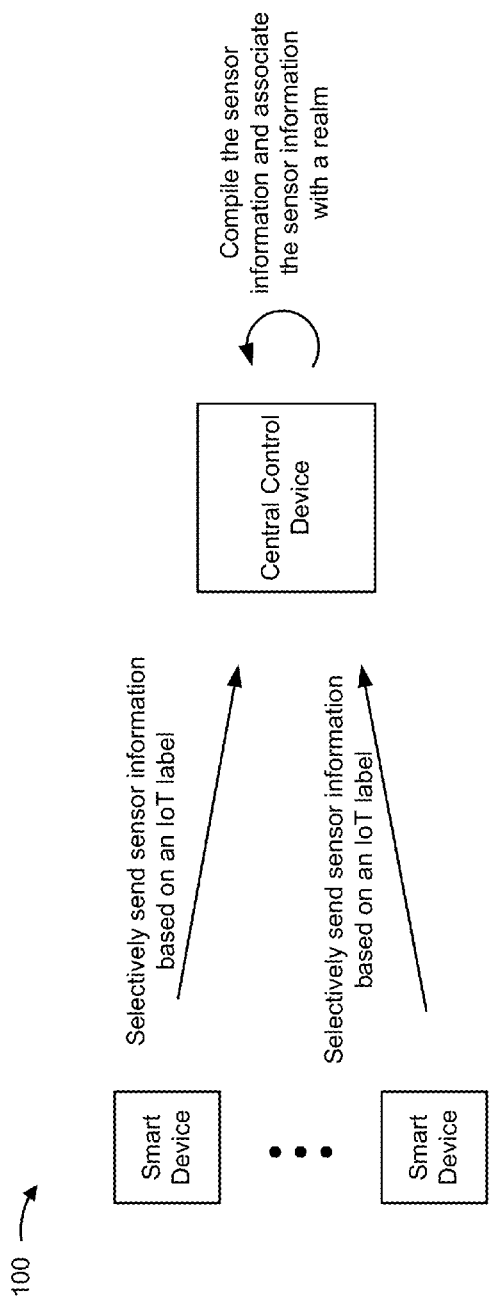
FIGS. 1A and 1B are diagrams of an overview of an example implementation described herein.
Figure 1B:
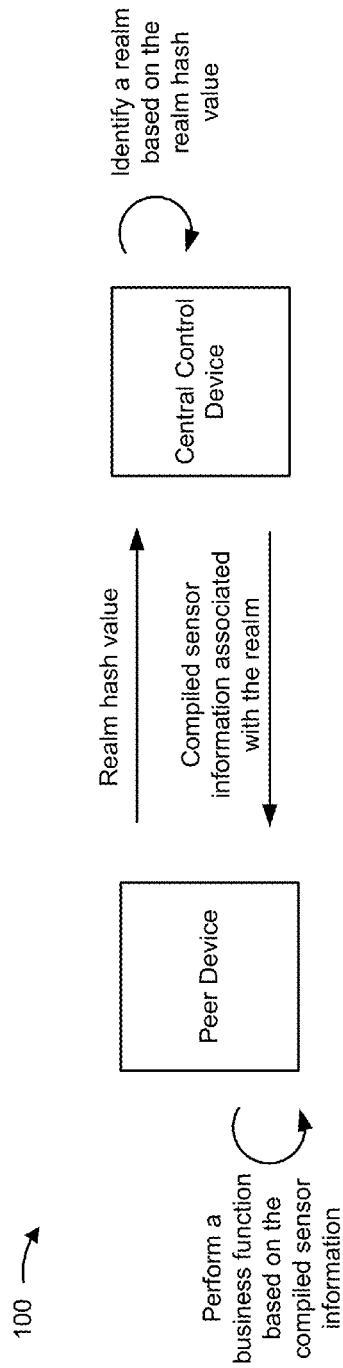

FIGS. 1A and 1B are diagrams of an overview of an example implementation 100 described herein. In FIG. 1A, assume smart devices (e.g., a sensor in a car, a head mounted display, a biomedical sensor, an appliance, etc.) have been set up to allow a central control device (e.g., a mobile phone, a tablet computer, etc.) to access particular information stored by the smart devices. For example, the smart devices may be set up by an administrative device that causes the smart devices to store credential information indicating an access level associated with a device credential. The access level may permit access to certain smart device data, smart device applications, and/or smart device functions. Additionally, or alternatively, the smart device may store encrypted access level hash values associated with different access levels.

In some implementations, the administrative device may send a device credential to the central control device. The central control device may store the device credential and send the device credential to a smart device in a security field of an IoT label. The smart device may determine an access level for the central control device based on the device credential and the stored credential information, and provide sensor information to the central control device based on the access level.

Additionally, or alternatively, the smart device may broadcast an IoT label including the encrypted access level hash values in the security field. The central control device may receive the IoT label and decrypt one of the encrypted access level hash values using a key provided to the central control device by the administrative device. The central control device may send an IoT label back to the smart device with the decrypted access level hash value in the security field. The smart device may determine an access level for the central control device based on the decrypted access level hash value, and provide sensor information to the central control device based on the access level.

The central control device may reformat the sensor information and compile the sensor information to be associated with different realms, which indicate settings, parameters, and/or conditions for using and/or sharing the sensor information.

In this way, sensor information stored by smart devices may be selectively provided to a central control device. Accordingly, only an authorized central control device may receive information from the smart devices and only authorized sensor information may be provided to the authorized central control device.

As shown in FIG. 1B, assume a peer device (e.g., a toll booth device, a parking meter, a server, a parking garage device, a police device, a retail store device, etc.) requests particular sensor information from the central control device. The peer device may only be authorized to access certain kinds of data stored by the central control device, and may not be authorized to access all kinds of data stored by the central control device. Thus, the peer device may send a realm hash value, with the request for the sensor information, for a realm of data that the peer device is authorized to access.

The central control device may receive the realm hash value and determine a realm associated with the realm hash value. The central control device may send the compiled sensor information associated with the realm to the peer device. The peer device may receive the compiled sensor information associated with the realm and use the compiled sensor information to perform a business function (e.g., pay a toll, pay for parking, provide advertisements/coupons to the central control device, etc.).

In this way, an owner of the smart devices and/or the central control device may securely share sensor information with peer devices using a central control device.

Figure 2:
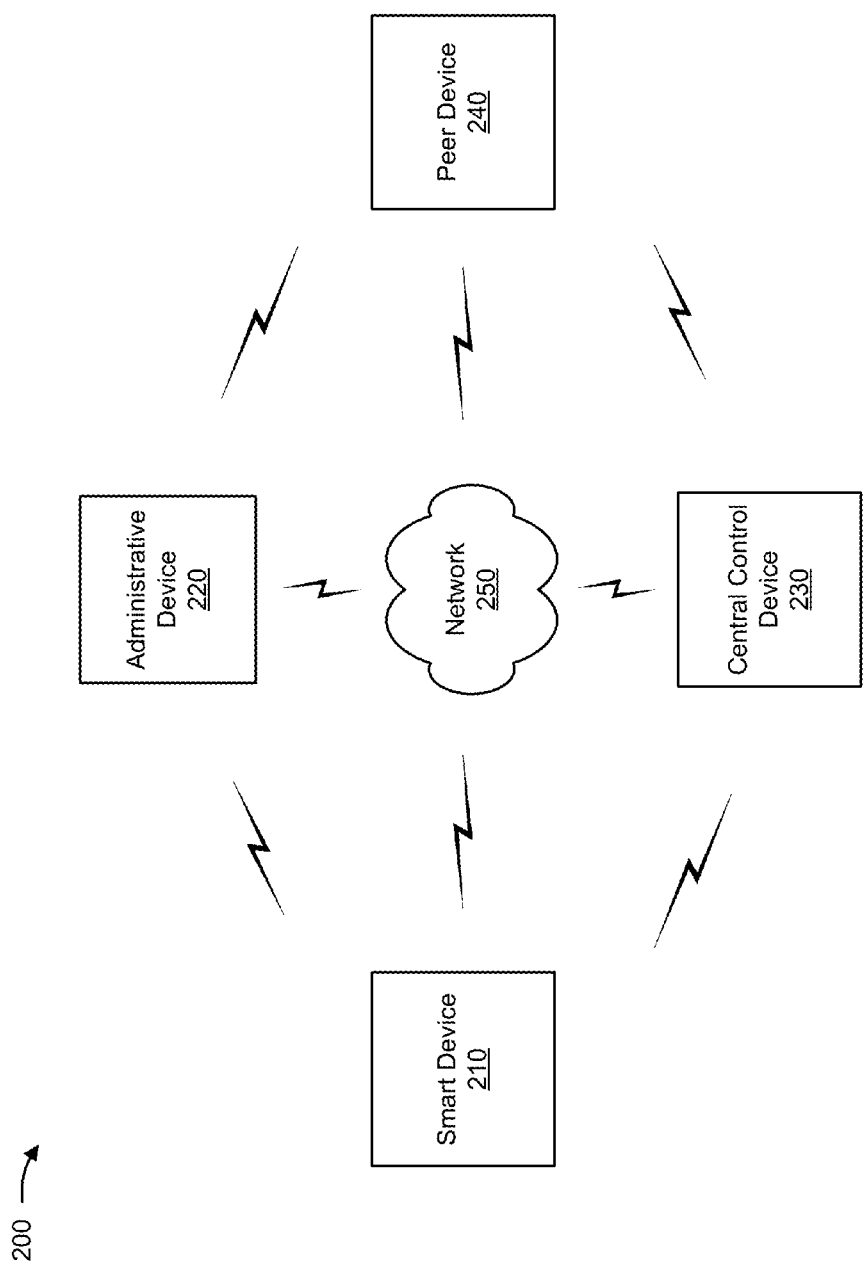
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a smart device 210, an administrative device 220, a central control device 230, a peer device 240, and/or a network 250. Devices of environment 200 may interconnect via wired connections, wireless connections, or a combination of wired and wireless connections.

Smart device 210 may include a device capable of receiving, processing, and/or providing information. For example, smart device 210 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), an appliance (e.g., a thermostat, an oven, a refrigerator, a microwave, a stove, etc.), a medical device, a biometric device, a wearable device, a car, a light bulb, and/or a similar device. In other words, smart device 210 may be any "thing" in the IoT. In some implementations, smart device 210 may include a communication interface that allows smart device 210 to receive information from and/or transmit information to another device in environment 200.

Administrative device 220 may include a device capable of receiving, processing, and/or providing information. For example, administrative device 220 may include a mobile phone (e.g., a smart phone, a radiotelephone, etc.), a computing device (e.g., a laptop computer, a tablet computer, a handheld computer, a gaming device, etc.), or a similar device. In some implementations, administrative device 220 may include a communication interface that allows administrative device 220 to receive information from and/or transmit information to another device in environment 200. In some implementations, administrative device 220 may set up smart device 210 and permit central control device 230 to access smart device 210.

Central control device 230 may include a device capable of receiving, processing, and/or providing information. For example, central control device 230 may include a mobile phone (e.g., a smart phone, a radiotelephone, etc.), a computing device (e.g., a laptop computer, a tablet computer, a handheld computer, a server, a gaming device, etc.), or a similar device. In some implementations, central control device 230 may include a communication interface that allows administrative device 220 to receive information from and/or transmit information to another device in environment 200. In some implementations, central control device 230 may selectively receive IoT data from smart device 210, organize the IoT data, and/or selectively send IoT data to peer device 240.

Peer device 240 may include a device capable of receiving, processing, and/or providing information. For example, peer device 240 may include a mobile phone (e.g., a smart phone, a radiotelephone, etc.), a computing device (e.g., a laptop computer, a tablet computer, a handheld computer, a gaming device, etc.), or a similar device. Additionally, or alternatively, peer device 240 may be a server device that communicates with central control device 230. In some implementations, peer device 240 may include a communication interface that allows peer device 240 to receive information from and/or transmit information to another device in environment 200. In some implementations, peer device 240 may gather IoT information from central control device 230.

In some implementations, administrative device 220, central control device 230, and/or peer device 240 may be a same kind of device. Additionally, or alternatively, administrative device 220, central control device 230, and/or peer device 240 may be implemented in a same device.

Network 250 may include one or more wired and/or wireless networks. For example, network 250 may include a cellular network (e.g., an long term evolution (LTE) network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
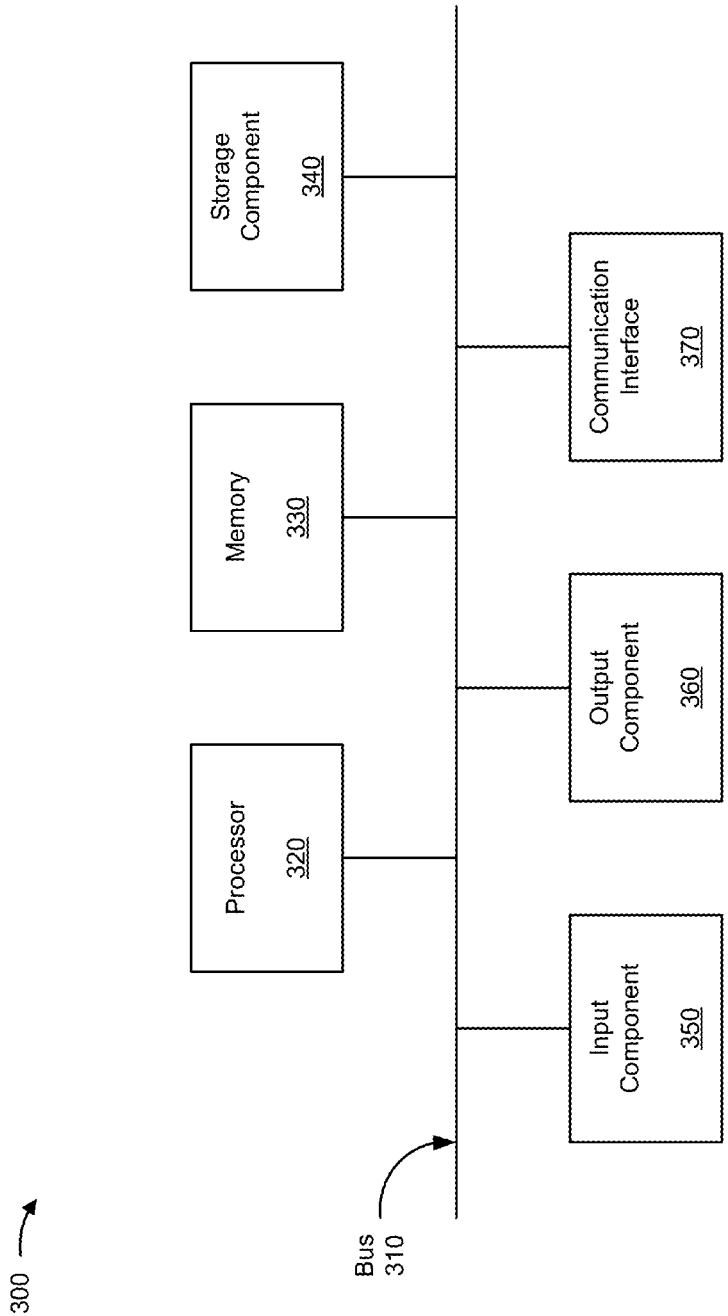
FIG. 3 is a diagram of example components of one or more devices of FIG. 2.

FIG. 3 is a diagram of example components of a device 300. Device 300 may correspond to smart device 210, administrative device 220, central control device 230, and/or peer device 240. In some implementations, smart device 210, administrative device 220, central control device 230, and/or peer device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, a camera (e.g., for gesture input), etc.). Additionally, or alternatively, input component 350 may include a sensor for sensing information (e.g., a global positioning system (GPS) component, an accelerometer, a gyroscope, an actuator, a biometric sensor, a magnetometer, a gravity sensor, a rotational sensor, a temperature/thermal sensor, a proximity sensor, a light sensor, a pressure sensor, a humidity sensor, an infrared sensor, a radio wave sensor, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
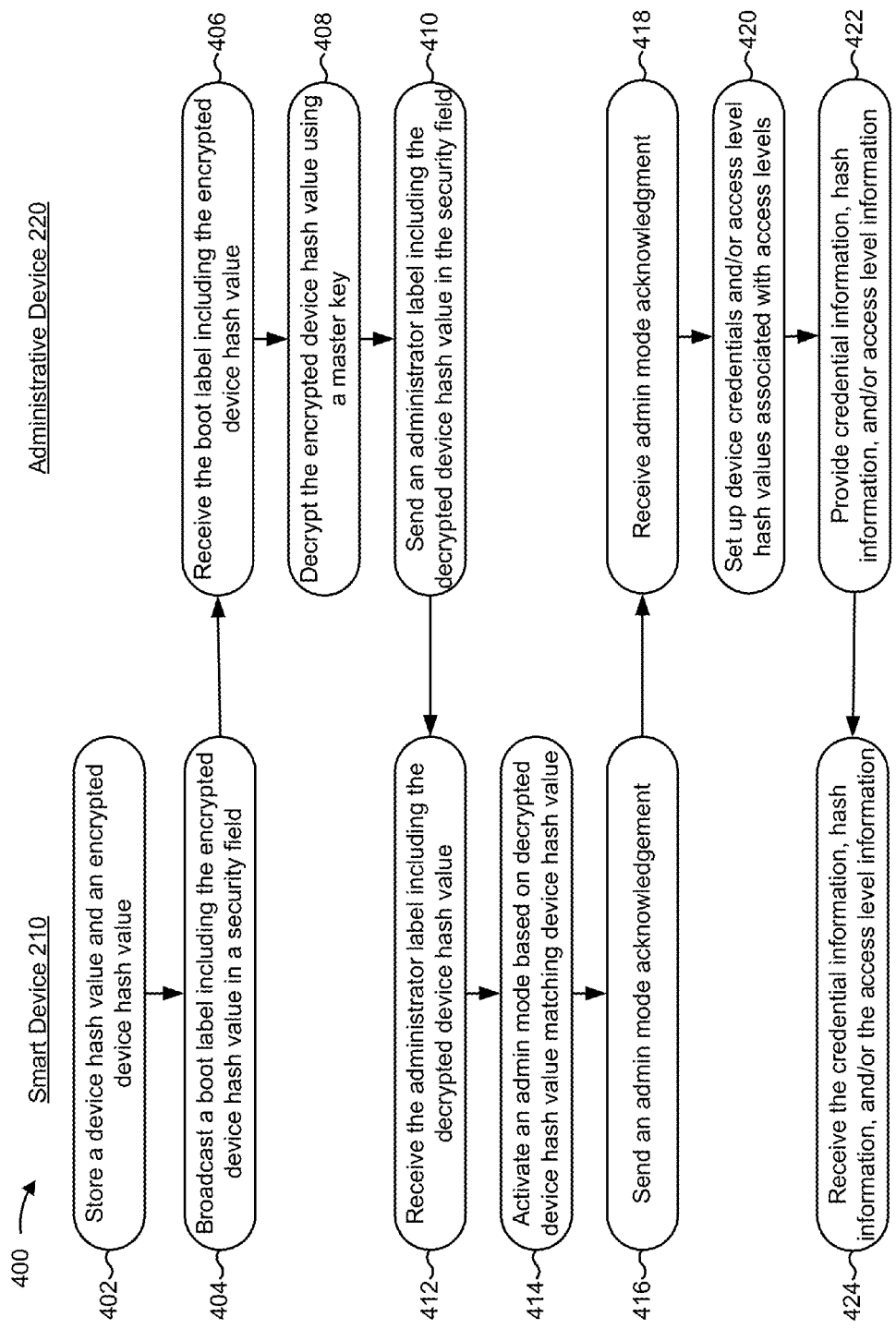
FIG. 4 is a flow chart of an example process for setting up a smart device to be used with an administrative device and/or a central control device.

FIG. 4 is a flow chart of an example process 400 for setting up smart device 210 to be used with administrative device 220 and/or central control device 230. In some implementations, one or more process blocks of FIG. 4 may be performed by smart device 210 and/or administrative device 220. Additionally, or alternatively, one or more process blocks of FIG. 4 may be performed by another device or a group of devices separate from or including smart device 210 and/or administrative device 220, such as central control device 230 and/or peer device 240.

As shown in FIG. 4, process 400 may include storing a device hash value and an encrypted device hash value (block 402). For example, smart device 210 may store the device hash value and the encrypted device hash value.

In some implementations, a smart device manufacturer may compute a device hash value that is unique to smart device 210. For example, the smart device manufacturer may compute the device hash value based on information unique to smart device 210 (e.g., a hardware network address, a serial number, manufacturing data, etc.). The smart device manufacturer may send the device hash value to smart device 210. Smart device 210 may receive the device hash value and store the device hash value in a memory. Additionally, or alternatively, the manufacturer may cause smart device 210 to store the device hash value during a manufacturing process of smart device 210.

In some implementations, the smart device manufacturer may use a master key to encrypt the device hash value to generate an encrypted device hash value. The smart device manufacture may send the encrypted device hash value to smart device 210. Smart device 210 may receive the encrypted device hash value and store the encrypted device hash value in a memory. Additionally, or alternatively, the manufacturer may cause smart device 210 to store the encrypted device hash value during a manufacturing process of smart device 210.

In some implementations, the smart device manufacturer may provide the master key to an authorized party (e.g., an owner of an administrative device 220 that purchases smart device 210).

As further shown in FIG. 4, process 400 may include broadcasting a boot label including the encrypted device hash value in a security field (block 404). For example, smart device 210 may broadcast the boot label.

In some implementations, the boot label may be an IoT label. An IoT label may be a bit sequence used to store binary values and may include a label header for managing smart device 210. The IoT label may have a universal labeling scheme including various fields, including a security field. The security field may be a specific field that includes security content used for security purposes. In the boot label, the security field may include the encrypted device hash value.

Smart device 210 may be dispensed for use after being manufactured and may be dispensed in a boot mode. While in the boot mode, smart device 210 may only have limited functions activated. For example, access to an application layer of smart device 210 may be deactive such that other devices may not access any application resources and/or application data stored by smart device 210 while smart device 210 is in the boot mode.

In some implementations, smart device 210 may broadcast the boot label while in the boot mode. Additionally, or alternatively, smart device 210 may respond to a request from a device (e.g., administrative device 220) by sending the boot label to the device.

As further shown in FIG. 4, process 400 may include receiving the boot label including the encrypted device hash value (block 406). For example, administrative device 220 may receive the boot label broadcast by smart device 210.

As further shown in FIG. 4, process 400 may include decrypting the encrypted device hash value using the master key (block 408). For example, administrative device 220 may decrypt the encrypted device hash value using the master key.

In some implementations, the device manufacturer may send the master key to administrative device 220. Administrative device 220 may receive the master key and store the master key in a memory included in or accessible by administrative device 220. Administrative device 220 may use the master key to decrypt the encrypted device hash value to obtain a decrypted device hash value.

As further shown in FIG. 4, process 400 may further include sending an administrator label including the decrypted device hash value in the security field (block 410). For example, administrative device 220 may send the administrator label to smart device 210.

Administrative device 220 may generate the administrator label to send to smart device 210 based on the decrypted device hash value. For example, the administrator label may be an IoT label having a universal labeling scheme including various fields, including a security field. In the administrator label, the security field may include the decrypted device hash value.

As further shown in FIG. 4, process 400 may include receiving the administrator label including the decrypted device hash value (block 412). For example, smart device 210 may receive the administrator label sent by administrative device 220.

As further shown in FIG. 4, process 400 may include activating an admin mode based on the decrypted device hash value matching the device hash value (block 414). For example, smart device 210 may activate the admin mode.

Smart device 210 may identify the decrypted device hash value included in the administrator label and compare the decrypted device hash value to the stored device hash value. If the decrypted device hash value matches the device hash value, smart device 210 may activate an admin mode and grant full administrative rights to administrative device 220. On the other hand, if the decrypted device hash value does not match the device hash value, smart device 210 may not activate the admin mode and may not grant administrative rights to administrative device 220.

While smart device 210 is in the admin mode, access to an application layer of smart device 210 may be activated such that other devices, with proper authorization, may access application resources and/or application data stored by smart device 210.

As further shown in FIG. 4, process 400 may include sending an admin mode acknowledgment (block 416). For example, smart device 210 may send the admin mode acknowledgement to administrative device 220 based on the activation mode being activated.

As further shown in FIG. 4, process 400 may include receiving the admin mode acknowledgement (block 418). For example, administrative device 220 may receive the admin mode acknowledgement sent by smart device 210.

Administrative device 220 and smart device 210 may exchange messages to complete basic activation tasks for smart device 210. For example, administrative device 220 and smart device 210 may set up admin credentials for administrative device 220 (e.g., a username, a password, an administrative device identifier, an admin key, a network address, etc.).

Smart device 210 may store the admin credentials for administrative device 220. The admin credentials may grant an admin access level that permits administrative device 220 full access to smart device 210. For example, the admin access level may permit administrative device 220 to read and/or write any information to and/or from smart device 210 and/or access all applications executed by smart device 210. Additionally, or alternatively, the admin access level may permit administrative device 220 to change settings for smart device 210.

As further shown in FIG. 4, process 400 may include setting up device credentials and and/or access level hash values associated with different access levels (block 420). For example, administrative device 220 may set a device credential (e.g., a username, a password, a central control device identifier, a key, a network address, etc.) for each central control device 230 authorized to access smart device 210. Additionally or alternatively, administrative device 220 may set up access level hash values associated with different access levels.

In some implementations, administrative device 220 may store access level information that indicates information, functions, applications, and/or settings to which each access level grants access. The access level information may be customizable by an operator of administrative device 220. For example, the operator of administrative device 220 may create access levels and specify which information, functions, applications, and/or settings to which each access level grants access. Additionally, or alternatively, the access level information may be set by default (e.g., by a manufacturer of smart device 210).

In some implementations, administrative device 220 may associate an access level with each device credential. The access level may grant access to central control device 230 to read and/or write particular information to and/or from smart device 210. For example, the access level may permit central control device 230 to read some kinds of information stored by smart device 210, but not all kinds of information stored by smart device 210. Additionally, or alternatively, the access level may permit access to particular applications, functions, and/or settings of smart device 210. In some implementations, the access levels may be hierarchical and each access level may grant access to a different amount of information, applications, functions, and/or settings. Additionally, or alternatively, each access level may grant access to separate information, separate functions, separate applications, and/or separate settings. In some implementations, the access level may be indicated by one or more fields associated with access to particular data, applications, functions, etc. In some implementations, administrative device 220 may associate an admin access level with a device credential that grants full access to smart device 210.

Administrative device 220 may store credential information that associates the device credentials with the access levels.

Additionally, or alternatively, administrative device 220 may generate an access level hash value associated with each access level. For example, administrative device 220 may generate an access level hash by hashing the access level information for a respective access level.

Each access level hash value may be encrypted with a respective access key to generate an encrypted access level hash value associated with each access level. Each access level may be associated with a respective access key.

Administrative device 220 may store hash information that indicates an access level hash value and an encrypted access level hash value associated with an access level.

As used herein, the hash information and the credential information may be generically referred to as access information. Furthermore, as used herein, the device credentials, the access level hash values, and/or the encrypted access level hash values may be generically referred to as authorization information.

As further shown in FIG. 4, process 400 may include providing the credential information, the hash information, and/or the access level information to smart device 210 (block 422). For example, administrative device 220 may provide the credential information, which associates device credentials with access levels, to smart device 210. Additionally, or alternatively, administrative device 220 may provide the hash information, which indicates access level hash values and encrypted access level hash values for respective access levels, to smart device 210. Additionally, or alternatively, administrative device 220 may provide the access level information, which indicates information, functions, applications and/or settings to which the access level grants access, to smart device 210.

As further shown in FIG. 4, process 400 may include receiving the credential information, the hash information, and/or the access level information (block 424). For example, smart device 210 may receive the credential information, the hash information, and/or the access level information from administrative device 220.

In some implementations, smart device 210 may store default access level information (e.g., set by the manufacturer of smart device 210) and may not receive access level information from administrative device 220.

Smart device 210 may store the credential information, which associates the device credentials with access levels. Additionally, or alternatively, smart device 210 may store the hash information, which indicates access level hash values and encrypted access level hash values associated with respective access levels.

As will be discussed in more detail with respect to FIGS. 5A and 5B, smart device 210 may use the credential information to grant a particular access level to a central control device 230 that provides particular device credentials. Additionally, or alternatively, smart device 210 may use the hash information to grant a particular access level to a central control device 230 that decrypts a particular encrypted access level hash value and provides a particular access level hash value in response.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
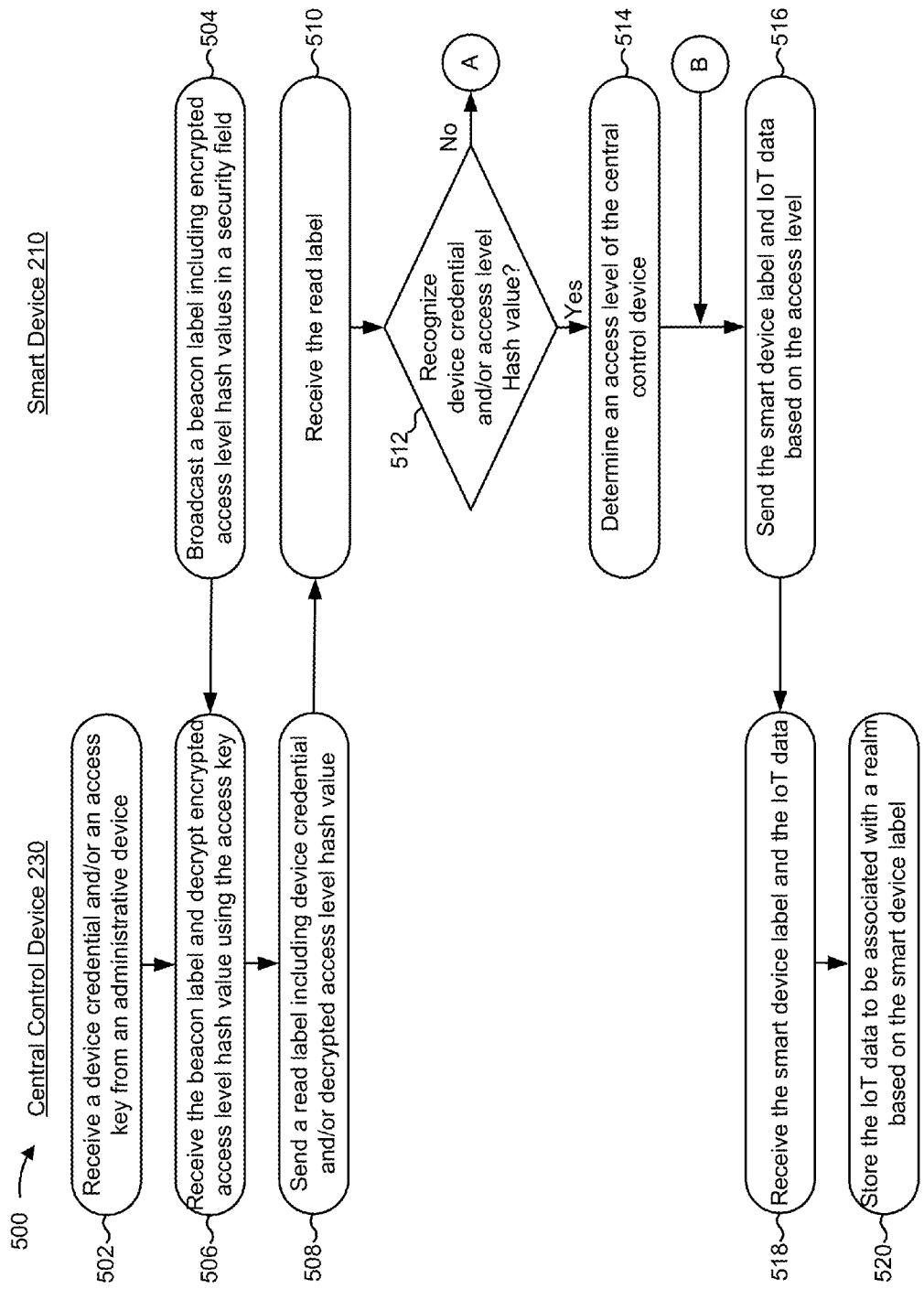
FIGS. 5A and 5B are flow charts of an example process for a smart device to selectively provide IoT data to a central control device.
Figure 5B:
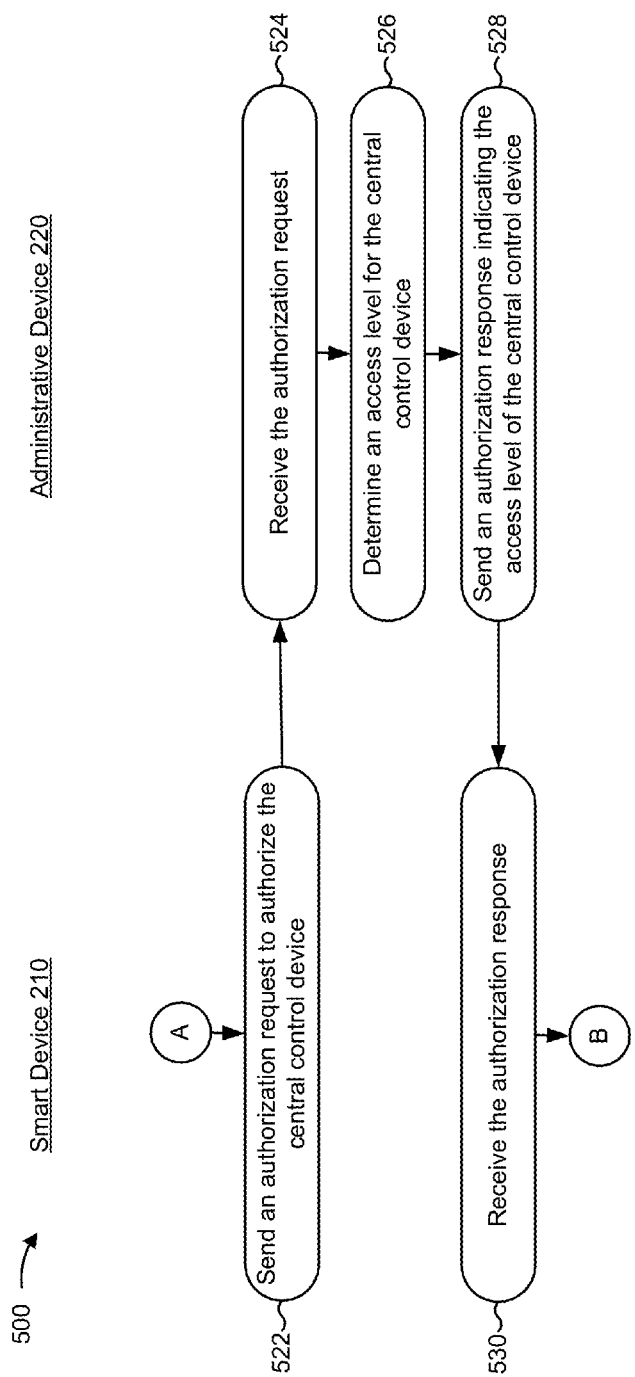

FIGS. 5A and 5B are flow charts of an example process 500 for smart device 210 selectively providing IoT data to central control device 230. In some implementations, one or more process blocks of FIGS. 5A and 5B may be performed by smart device 210 and/or central control device 230. Additionally, or alternatively, one or more process blocks of FIGS. 5A and 5B may be performed by another device or a group of devices separate from or including smart device 210 and/or central control device 230, such as administrative device 220 and/or peer device 240.

As shown in FIG. 5A, process 500 may include receiving a device credential and/or an access key from administrative device 220 (block 502). For example, central control device 230 may receive the device credential and/or the access key from administrative device 220.

In some implementations, administrative device 220 may determine a device credential and/or an access key for central control device 230 based on the access level to be granted to central control device 230. Central control device 230 may receive the device credential and/or the access key and store the device credential and/or the access key in a memory included in or accessible by central control device 230.

As further shown in FIG. 5A, process 500 may include broadcasting a beacon label including multiple encrypted access level hash values in a security field (block 504). For example, smart device 210 may broadcast the beacon label. The beacon label may be an IoT label having a universal labeling scheme including various fields, including a security field. In the beacon label, the security field may include encrypted access level hash values for each access level that may be used to access smart device 210. In some implementations, smart device 210 may obtain the encrypted access level hash values to include in the security field from the stored hash information.

In some implementations, smart device 210 may initiate communication with central control device 230 by broadcasting the beacon label. Additionally, or alternatively, central control device 230 may initiate communication with smart device 210 by sending a request to send the beacon label, and smart device 210 may respond to the request from central control device 230 by broadcasting the beacon label to central control device 230.

As further shown in FIG. 5A, process 500 may include receiving the beacon label and decrypting an encrypted access level hash value using the access key (block 506). For example, central control device 230 may receive the beacon label sent by smart device 210 and decrypt the encrypted access level hash value.

In some implementations, central control device 230 may store an access key provided by administrative device 220 and/or another device. Central control device 230 may attempt to decrypt the encrypted access level hash values included in the beacon label using the access key. The access key may decrypt at least one of the encrypted access level hash values. For example, the access key may decrypt an encrypted access level hash value associated with an access level that central control device 230 is permitted to use to access smart device 210. Accordingly, central control device 230 may obtain a decrypted access level hash value.

In some implementations, smart device 210 may not send a beacon label, and process 500 may skip blocks 504 and 506, and advance from block 502 to block 508.

As further shown in FIG. 5A, process 500 may include sending a read label including the device credential and/or the decrypted access level hash value (block 508). For example, central control device 230 may send the read label to smart device 210.

The read label may be an IoT label having a universal labeling scheme including various fields, including a security field. In the read label, the security field may include the device credential and/or the decrypted access level hash value. Additionally, or alternatively, the read label may include a request that IoT data stored by smart device 210 be provided to central control device 230.

As further shown in FIG. 5A, process 500 may include receiving the read label (block 510). For example, smart device 210 may receive the read label sent by central control device 230.

As further shown in FIG. 5A, process 500 may include determining whether the device credential and/or the decrypted access level hash value matches a stored device credential and/or a stored access level hash value (block 512). For example, smart device 210 may determine whether the device credential included in the read label matches a device credential included in the credential information stored by smart device 210. Additionally, or alternatively, smart device 210 may determine whether the decrypted access level hash value included in the read label matches an access level hash value included in the stored hash information.

As further shown in FIG. 5A, if smart device 210 determines the device credential and/or the decrypted access level hash value matches a stored device credential and/or a stored access level hash value (block 512—yes), process 500 may include determining an access level of central control device 230 (block 514). For example, smart device 210 may determine the access level of central control device 230.

In some implementations, smart device 210 may determine the access level based on the device credential and the access level associated with the device credential as indicated by the stored credential information. Additionally, or alternatively, smart device 210 may determine the access level based on the access level hash value and the access level associated with the access level hash value as indicated by the stored hash information.

As further shown in FIG. 5A, process 500 may include sending a smart device label and IoT data to central control device 230 based on the access level (block 516). For example, smart device 210 may send the smart device label and the IoT data to central control device 230.

In some implementations, the smart device label may be an IoT label having a universal labeling scheme including various fields. The smart device label may include information identifying smart device 210 and/or the IoT data sent by smart device 210. For example, the smart device label may indicate a type of IoT data associated with the IoT data or restrictions on use of the IoT data. For example, the restriction may restrict transfer of the IoT data to a peer device 240 and/or a kind of peer device 240, restrict transfer of ownership of the IoT data, restrict a time that the IoT data may be transferred to peer device 240, etc.

The IoT data may be any kind of data stored by smart device 210. In some implementations, the IoT data may include information detected by a sensor included in or attached to smart device 210, but the IoT data is not limited to data detected by a sensor. For example, the IoT data may include data detected by a GPS component, an accelerometer, a gyroscope, an actuator, a biometric sensor, a magnetometer, a gravity sensor, a rotational sensor, a temperature/thermal sensor, a proximity sensor, a light sensor, a pressure sensor, a humidity sensor, an infrared sensor, a radio wave sensor, or the like. Additionally, or alternatively, the IoT data may include financial information (e.g., information on spending, bank account information, credit card information, etc.), navigation information (e.g., identifying where and when smart device 210 was located, favorite locations, etc.), personal information (e.g., information identifying an age, a health status, a birthday, a social security number, a marital status, etc. of a person associated with smart device 210), and/or similar information.

Smart device 210 may determine that all or part of the IoT data, stored by smart device 210, may be sent to central control device 230 based on the access level for central control device 230. For example, a particular access level may grant access to a first type of IoT data (e.g., GPS information) stored by smart device 210, but not a second type of IoT data (e.g., biometric information) stored by smart device 210.

Smart device 210 may send the smart device label and the IoT data that central control device 230 is authorized to access, as determined based on the access level for central control device 230, to central control device 230.

As further shown in FIG. 5A, process 500 may include receiving the smart device label and the IoT data (block 518). For example, central control device 230 may receive the smart device label and the IoT data sent by smart device 210.

As further shown in FIG. 5A, process 500 may include storing the IoT data to be associated with a realm based on the smart device label (block 520). For example, central control device 230 may store the IoT data to be associated with a realm. A realm may be information that specifies settings, parameters, and/or conditions for sending IoT data to a peer device 240.

In some implementations, central control device 230 may recognize the format of the IoT data and strip off any non-application related data (e.g., header data, control data, etc.) from the IoT data. In some implementations, the central control device 230 may recognize the data format based on the smart device label.

In some implementations, central control device 230 may modify the IoT data to delete or discard particular information included in the IoT data. For example, central control device 230 may store central control device settings (e.g., set by a user of central control device 230 and/or default settings) to delete particular IoT data (e.g., certain kinds of personal information). Additionally, or alternatively, the central control device settings may instruct central control device 230 to add tags to the IoT data indicating priorities and/or instructions to anonymize or personalize the tagged data. For example, central control device 230 may strip any user identifying data from the IoT data so that the IoT data may not be tied to a user or smart device 210.

Furthermore, the central control device settings may indicate that particular IoT data may only be stored for a limited time, may only be transmitted by central control device 230 to a peer device 240 at certain times and/or via certain communication types (e.g., LTE, Bluetooth, Wi-Fi, 3G, etc.), and/or may or may not be provided to a peer device 240 in real time (e.g., without central control device 230 storing the IoT data).

In some implementations, the central control device settings may indicate a type of IoT data associated with the received IoT data or restrictions on use of the IoT data.

Central control device 230 may store the IoT data (or the IoT data as modified by the central control device settings) in a memory included in or accessible by central control device 230.

In some implementations, central control device 230 may store one or more realms. In some implementations, a realm may be a standardized data structure that includes various fields specifying settings, parameters, and/or conditions for using IoT data associated with the realm. For example, each realm may include fields for destination information, timer information, communication type information, priority information, size information, and/or data type information. The destination information may indicate a destination to which IoT data associated with the realm may be sent (e.g., a device identifier, a user identifier, a type of device, a type of user, a host address, an application port, etc.). The timer information may indicate times at which the IoT data associated with the realm may be sent (e.g., never, once connected, hourly, daily, etc.). The communication type information may indicate a type of communication that may be used to send the IoT data associated with the realm (e.g., Near Field Communication (NFC), Wi-Fi, LTE, Bluetooth, etc.). The priority information may indicate a priority with which the IoT data associated with the realm should be sent. The size information may indicate a size of the IoT data associated with the realm.

The data type information may indicate a type of IoT data associated with the realm. For example, the data type information may indicate authority information (e.g., data relevant to public authorities), personal information (e.g., data that may be subject to anonymization), financial information, navigation information, weather information, commercial information (e.g., data used for commercial purposes), and/or any other type of information.

In some implementations, the data type information may indicate trading information (e.g., data subject to trading and/or selling). Trading information may indicate information about owner rights to the data and whether the owner rights may be transferred.

In some implementations, central control device 230 may store an encrypted realm hash value associated with each realm. Central control device 230 may generate the encrypted realm hash value by hashing the realm using a cryptographic hash function (e.g., MD5).

The IoT data may be associated with one or more realms based on the smart device label and/or the central control device settings. For example, the smart device label and/or the central control device settings may indicate a destination and/or a data type for the IoT data that correspond to a particular realm. Central control device 230 may associate the IoT data with a realm by storing a pointer to the IoT data with the realm.

In some implementations, data generated and/or stored by central control device 230 may be associated with a realm. For example, central control device 230 may store personal information about a user of central control device 230 (e.g., a name, an age, etc.), financial information (e.g., a credit card number, a virtual wallet, etc.), sensor information (e.g., information detected by a sensor included in central control device 230), etc.

Additionally, or alternatively, a realm may be used by central control device 230 to request IoT data from smart device 210. For example, a realm may be used as the basis for sending a read request and/or a read label to smart device 210 (e.g., as discussed with respect to block 508). For instance, the destination information in a realm may indicate a destination from which to obtain IoT data (e.g., a smart device identifier, an application type, etc.). The timer information may indicate a time to request the IoT data. The communication type information may indicate a type of communication to use to request the IoT data. The data type information may indicate a type of IoT data to request from smart device 210.

As shown in FIG. 5B, if smart device 210 determines the device credential and/or the decrypted access level hash value does not match a stored device credential and/or a stored access level hash value (block 512—no), process 500 may include sending an authorization request to authorize central control device 230 (block 522). For example, smart device 210 may send the authorization request to administrative device 220.

In some implementations, the authorization request may indicate the device credential received from central control device 230.

As further shown in FIG. 5B, process 500 may include receiving the authorization request (block 524). For example, administrative device 220 may receive the authorization request from smart device 210.

As further shown in FIG. 5B, process 500 may include determining an access level for central control device 230 (block 526). For example, administrative device 220 may determine the access level for central control device 230.

As previously discussed at block 420 in FIG. 4, administrative device 220 may store credential information that associates device credentials with the access levels. In some implementations, administrative device 220 may update the credential information and send updates to smart device 210 indicating the updated credential information. For example, administrative device 220 may update the access level associated with the device credential, add a device credential associated with an access level, and/or delete a device credential.

However, a newly authorized central control device 230 may attempt to communicate with smart device 210 before administrative device 220 sends the update information to smart device 210. Accordingly, the credential information stored by administrative device 220 may not always match the credential information stored by smart device 210. Thus, administrative device 220 may search the stored credential information using the device credential, included in the authorization request, that smart device 210 did not recognize and identify an access level associated with the device credential. In some implementations, the stored credential information may not indicate an access level for the device credential due to central control device 230 not being authorized to access smart device 210.

As further shown in FIG. 5B, process 500 may include sending an authorization response indicating the access level of central control device 230 (block 528). For example, administrative device 220 may send the authorization response to central control device 230.

The authorization response may include a particular IoT label that indicates the access level, if any, for central control device 230. Additionally, or alternatively, the authorization response may indicate a time limit on the access level.

As further shown in FIG. 5B, process 500 may include receiving the authorization response (block 530). For example, smart device 210 may receive the authorization response sent by administrative device 220. Smart device 210 may determine the access level for central control device 230 based on the authorization response and proceed to block 516 (FIG. 5A).

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Figure 6:
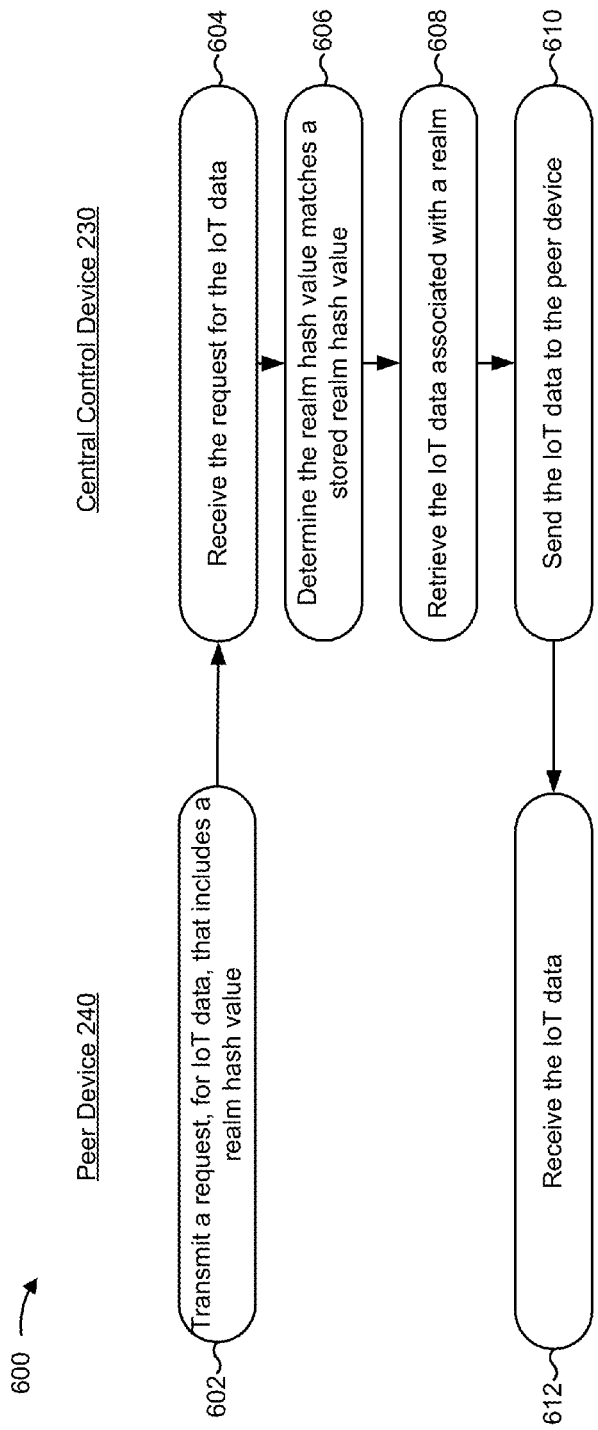
FIG. 6 is a flow chart of an example process for a central control device to selectively send IoT data to a peer device.

FIG. 6 is a flow chart of an example process 600 for central control device 230 selectively sending IoT data to peer device 240. In some implementations, one or more process blocks of FIG. 6 may be performed by central control device 230 and/or peer device 240. Additionally, or alternatively, one or more process blocks of FIG. 6 may be performed by another device or a group of devices separate from or including central control device 230 and/or peer device 240, such as smart device 210 and/or administrative device 220.

As shown in FIG. 6, process 600 may include transmitting a request, for IoT data, that includes a realm hash value (block 602). For example, peer device 240 may transmit the request for IoT data to central control device 230.

In some implementations, peer device 240 and central control device 230 may establish a secure connection using a transport layer security (TLS) protocol and/or a secure sockets layer (SSL) protocol. Additionally, or alternatively, peer device 240 and central control device 230 may establish a secure connection based on authentication information (e.g., username, password, etc.). In some implementations, an unsecure connection may be established between peer device 240 and central control device 230. Peer device 240 may send the request for the IoT data to central control device 230 via the secure connection and/or the unsecure connection.

In some implementations, peer device 240 may be authorized to access IoT data associated with one or more realms and peer device 240 may store the one or more realms. Peer device 240 may generate a realm hash value for a realm using a hash function (e.g., MD5, MD4, secure shell (SSH), etc.). Peer device 240 may include the realm hash value in the request sent to central control device 230 to indicate that peer device 240 is authorized to access IoT data associated with the realm. Additionally, or alternatively, the request may be encrypted separately.

As further shown in FIG. 6, process 600 may include receiving the request for the IoT data (block 604). For example, central control device 230 may receive the request from peer device 240.

As further shown in FIG. 6, process 600 may include determining that the realm hash value matches a stored realm hash value of a realm (block 606). For example, central control device 230 may determine the realm hash value included in the request matches a stored realm hash value.

Central control device 230 may compare the realm hash value received from peer device 240 to stored realm hash values associated with realms. If the received realm hash value matches one of the stored realm hash values, central control device 230 may determine peer device 240 is authorized to receive IoT data for the realm associated with the realm hash value. In such a case, central control device 230 may determine to send IoT data associated with the realm to peer device 240. On the other hand, if the received realm hash value does not match one of the stored realm hash values, central control device 230 may determine peer device 240 is not authorized to receive IoT data associated with a realm. In such a case, central control device 230 may not send IoT data to peer device 240.

As further shown in FIG. 6, process 600 may include retrieving IoT data associated with the realm (block 608). For example, central control device 230 may retrieve the IoT data associated with the realm from a memory included in or accessible by central control device 230. The IoT data may include data gathered from one or more smart devices 210 and/or stored by central control device 230.

Additionally, or alternatively, central control device 230 may request the IoT data from a smart device 210 in real time. For example, in some implementations, central control device 230 may not store any IoT data associated with the realm at the time peer device 240 sends the request. As previously discussed, in some implementations, a realm may be used by central control device 230 to request IoT data from smart device 210. For instance, the destination information in a realm may indicate a destination from which to obtain IoT data (e.g., a smart device identifier, an application type, etc.). Accordingly, central control device 230 may obtain the IoT data associated with the realm from smart device 210, based on the request from peer device 240, and/or from a memory included in or accessible by central control device 230.

As further shown in FIG. 6, process 600 may include sending the IoT data to peer device 240 (block 610). For example, central control device 230 may send the IoT data to peer device 240.

In some implementations, central control device 230 may check that peer device 240 satisfies settings for the realm. For example, central control device 230 may determine whether peer device 240 is an appropriate destination to send the IoT data based on the destination information included in the realm, whether the IoT data is being sent consistent with the communication type information (e.g., via NFC, Bluetooth, LTE, Wi-Fi, etc.), whether the IoT data is being sent at a time consistent with the timer information, etc. If central control device 230 determines that sending the IoT data to peer device 240 is consistent with the realm, then central control device 230 may send the IoT data. On the other hand, if central control device 230 determines that sending the IoT data to peer device 240 is not consistent with the realm, then central control device 230 may not send the IoT data to peer device 240.

As further shown in FIG. 6, process 600 may include receiving the IoT data (block 612). For example, peer device 240 may include receiving the IoT data from central control device 230. Peer device 240 may perform a function based on the received IoT data. For example, peer device 240 may use the IoT data to pay a toll, to pay for parking, to provide a coupon or advertisement to central control device 230, to conduct research, to change air conditioning settings, etc.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
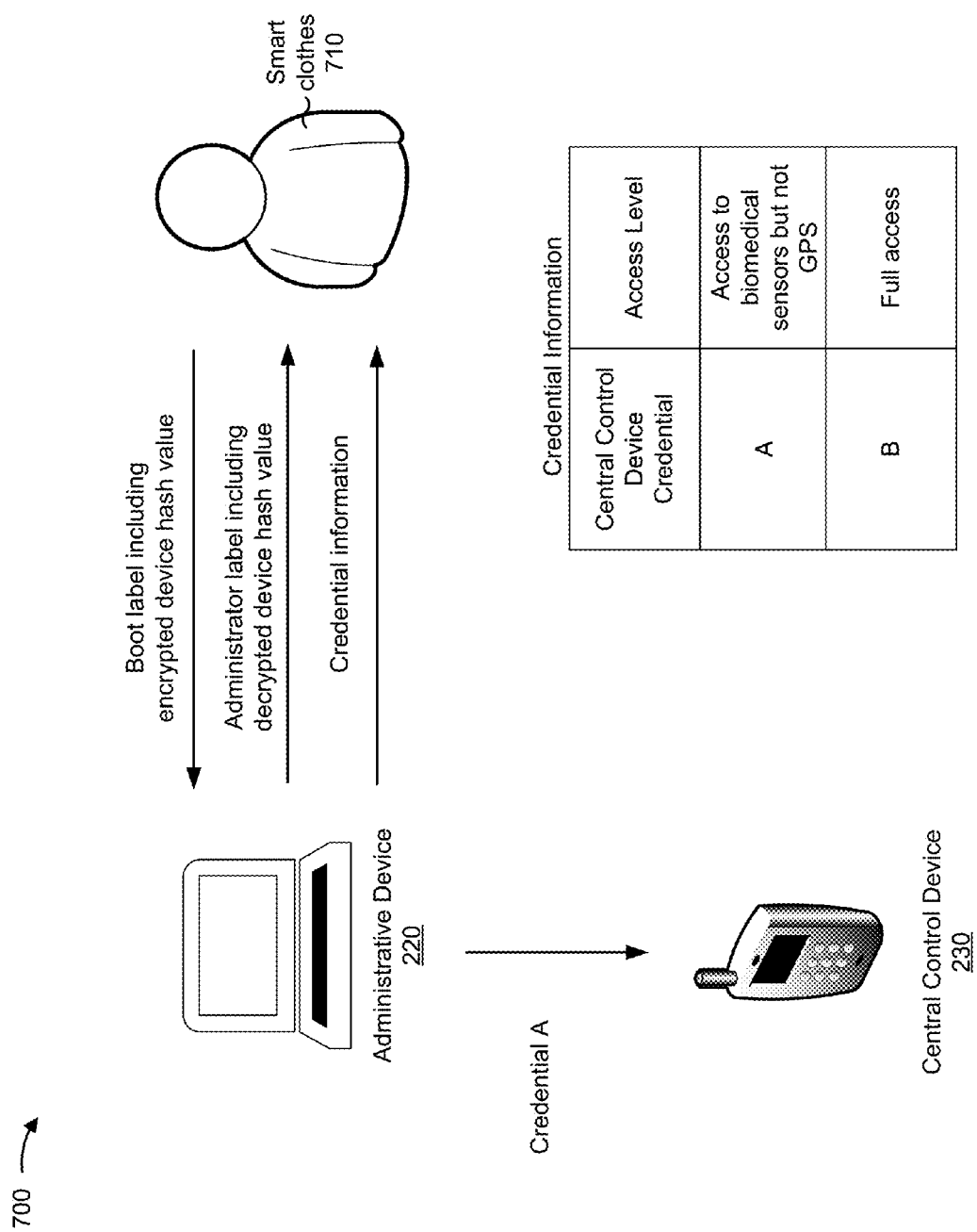
FIGS. 7A-7C are diagrams of an example implementation relating to the example processes shown in FIGS. 4-6.
Figure 7B:
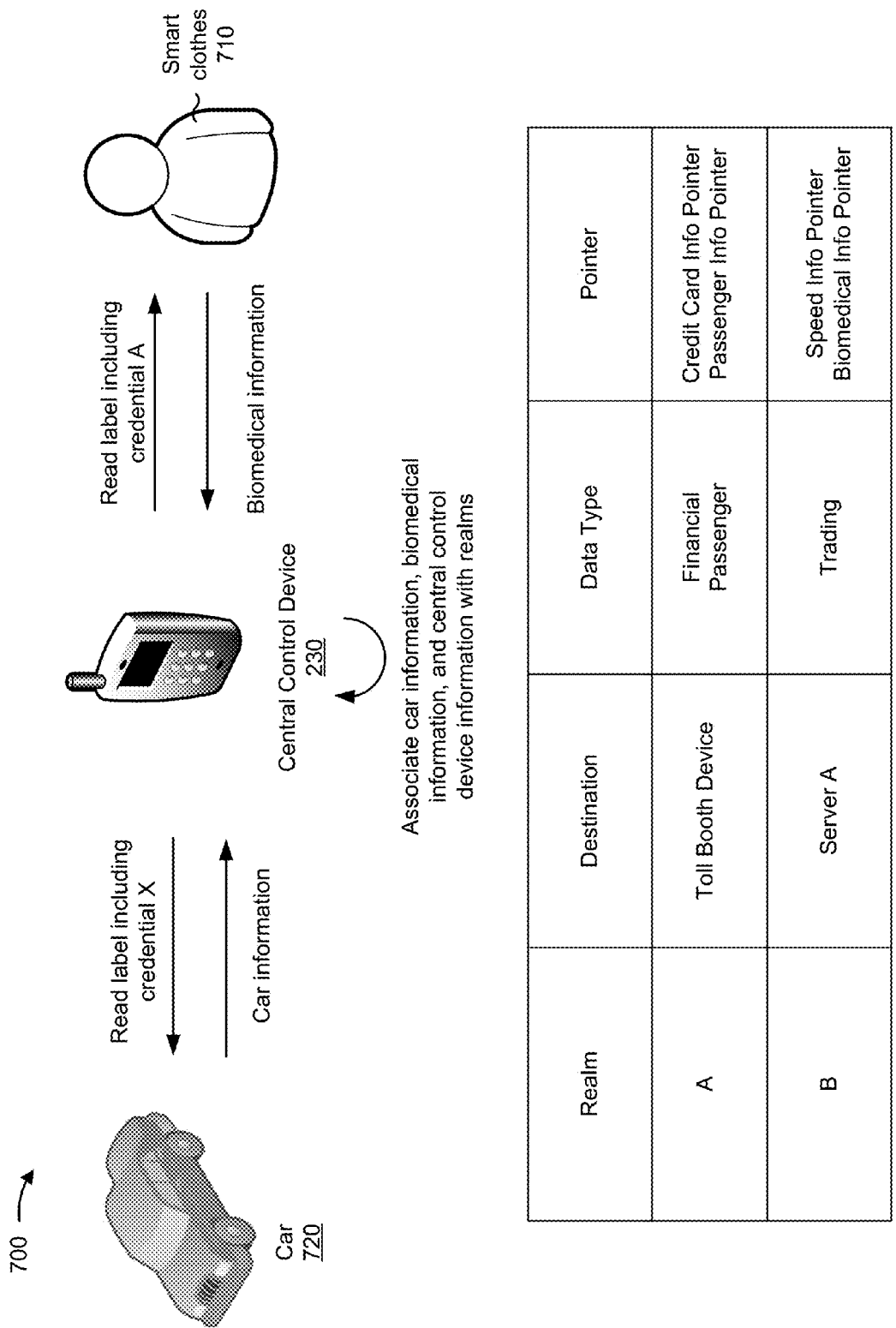
Figure 7C:
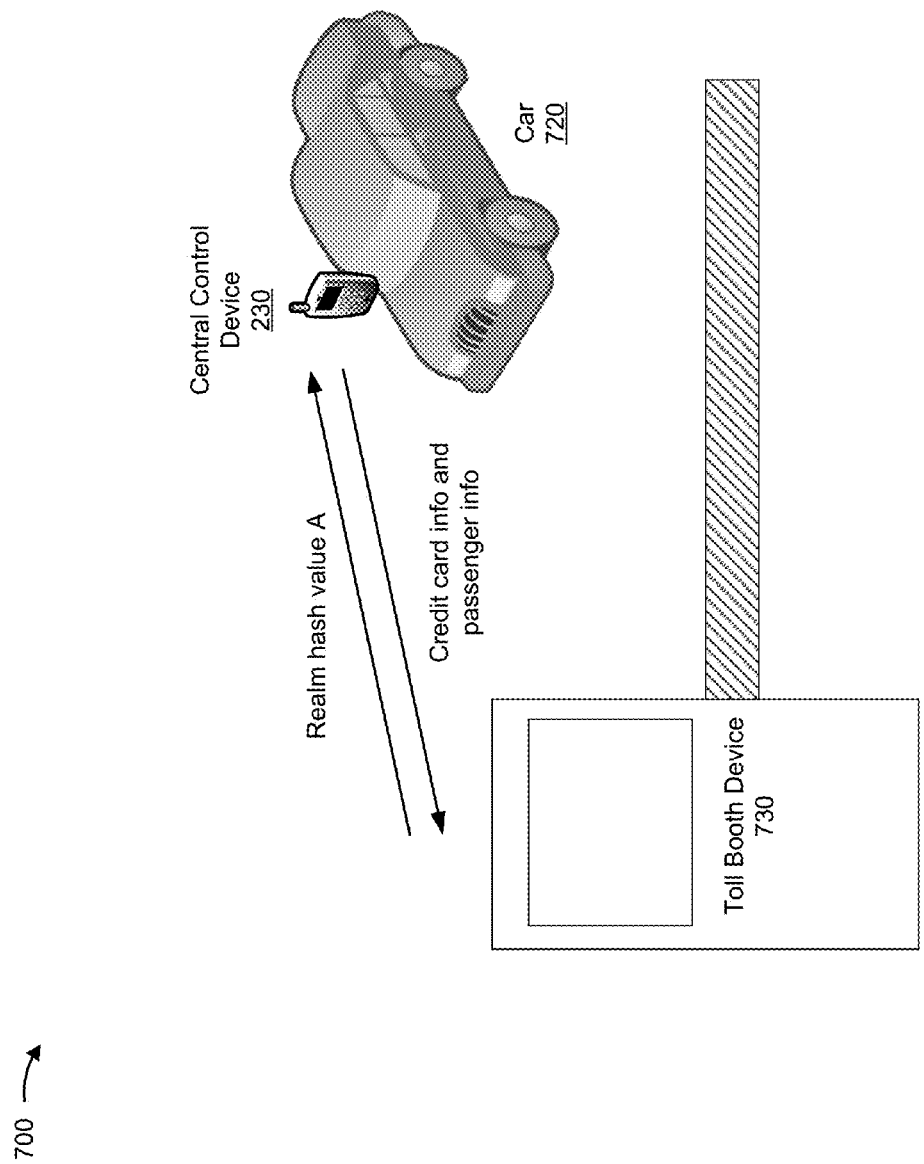

FIGS. 7A-7C are diagrams of an example implementation 700 relating to example processes 400-600 shown in FIGS. 4-6. FIGS. 7A-7C show an example of setting up smart device 210 to be used with administrative device 220 and/or central control device 230, selectively providing IoT data to central control device 230, and selectively sending IoT data to peer device 240.

In FIG. 7A, assume a company buys smart clothes 710 (e.g., smart device 210) for the company's employees. Assume smart clothes 710 include a biomedical sensor and a GPS device. Further, assume a manufacturer of the smart clothes 710 provides the company with a master key used to set up the smart clothes 710. Also, assume the manufacturer causes smart clothes 710 to store a device hash value and an encrypted device hash value.

As shown in FIG. 7A, smart clothes 710 may broadcast a boot label including the encrypted device hash value. An administrative device 220, operated by the company, may receive the boot label and use the master key to decrypt the encrypted device hash value. Administrative device 220 may send an administrator label, including the decrypted device hash value, to smart clothes 710 and cause smart clothes 710 to enter an admin mode.

Administrative device 220 may set up credential information for smart clothes 710. As shown in FIG. 7A, the credential information may associate a central control unit credential with an access level. For example, a credential A may be associated with an access level that grants access to biomedical sensor information, but not GPS information. Furthermore, a credential B may be associated with an access level that grants full access to smart clothes 710.

Administrative device 220 may send the credential information to smart clothes 710. Smart clothes 710 may receive the credential information and store the credential information.

Furthermore, administrative device 220 may send information identifying credential A to central control device 230. Central control device 230 may receive the information identifying credential A and store the information. Although not illustrated in FIG. 7A, administrative device 220 may further send information identifying credential B to a different central control device 230 that is to be given full access to smart clothes 710.

In FIG. 7B, assume a car 720 (e.g., smart device 210) has been similarly set up and stores credential information that indicates a full access level is associated with a credential X.

As shown in FIG. 7B, central control device 230 may send a read label including credential A to smart clothes 710 that requests biomedical information stored by smart clothes 710. For example, the biomedical information may indicate a pulse, a body temperature, a stress level, etc. Smart clothes 710 may receive the read label and determine that credential A grants access to the biomedical information. Accordingly, smart clothes 710 may send the biomedical information to central control device 230 and central control device 230 may receive the biomedical information.

As further shown in FIG. 7B, central control device 230 may send a read label including credential X to car 720 that requests car information stored by car 720. For example, the car information may indicate a speed of the car, how many passengers are in the car, an air conditioning setting for the car, GPS information (e.g., indicating where the car has driven), etc. Car 720 may receive the read label and determine the credential X grants access to the car information. Accordingly, car 720 may send the car information to central control device 230 and central control device 230 may receive the car information.

In some implementations, central control device 230 may store central control device information (e.g., credit card information, personal information, Internet browser history information, etc.). Central control device 230 may associate the car information, the biomedical information, and the central control device information with different realms.

For example, as shown in FIG. 7B, central control device 230 may store a realm A and a realm B, which are each associated with destination information and data type information. Assume a destination for realm A is a toll booth and a data type of information associated with the realm is financial and passenger information (e.g., how many people are in a car). Further, assume a destination for realm B is server A and a data type of information associated with the realm is trading information. For example, an owner of central control device 230 may have an agreement with an owner of server A to share IoT data in exchange for compensation. Assume central control device 230 associates credit card information (included in the central control device information) and passenger information (included in the car information) with realm A. Further, assume central control device 230 associates speed information (included in the car information) and biomedical information with realm B.

In some implementations, central control device 230 may use the received car information and/or biomedical information to send commands to particular devices. For example, if the biomedical information obtained from smart clothes 710 indicates the body temperature of a user satisfies a threshold level, central control device 230 may send a command to car 720 to change an air conditioning/heating setting.

In FIG. 7C, assume car 720, having central control device 230 inside, approaches a toll booth that includes a toll booth device 730 (e.g., peer device 240). Further, assume toll booth 730 stores a realm hash value A for realm A that allows toll booth 730 to access particular information stored by one or more central control devices 230. Central control device 230 may also store the realm hash value A and associate the realm hash value A with realm A.

As shown in FIG. 7C, toll booth device 730 and central control device 230 may establish a connection and toll booth device 730 may send a request for information and the realm hash value A to central control device 230.

Central control device 230 may receive the realm hash value A and determine whether the realm hash value A matches any realm hash values stored by central control device 230. Assume central control device 230 determines the realm hash value A matches the realm hash value associated with realm A. Accordingly, central control device 230 may obtain the credit card information and the passenger information associated with realm A and send the credit card information and the passenger information to toll booth device 730.

Toll booth device 730 may receive the credit card information and the passenger information and charge a toll. For example, toll booth device 730 may determine an amount for the toll based on the number of people in the car, as indicated by the passenger information, and charge a credit card, as indicated by the credit card information, for the amount of the toll.

As indicated above, FIGS. 7A-7C are provided merely as an example. Other examples are possible and may differ from what was described with regard to FIGS. 7A-7C.

Implementations described herein may allow a smart device to selectively send data to a central control device based on an IoT label. Additionally, or alternatively, a central control device may compile data from multiple smart devices to be associated with a realm and securely send the compiled data to other devices based on a realm hash value.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory storing instructions; and one or more processors to execute the instructions to:
    store a device hash value and an encrypted device hash value, the encrypted device hash value being an encrypted version of the device hash value;
    send a first label, the first label including the encrypted device hash value;
    receive a second label from an administrative device based on sending the first label, the second label including a decrypted device hash value;
    determine that the decrypted device hash value matches the device hash value;
    activate a mode that permits application layer access of the device based on the decrypted device hash value matching the device hash value;
    receive access information from the administrative device after activating the mode, the access information indicating an access level, the access level being associated with particular data that is permitted to be read from the device, and the access information associating first authorization information and the access level;
    receive a third label and a request, to provide data, from a control device, the third label including second authorization information;
    determine the second authorization information does not match the first authorization information;
    send, based on determining that the second authorization information does not match the first authorization information, an authorization request to authenticate the control device to the administrative device, the authorization request including the second authorization information;
    receive a response from the administrative device indicating another access level for the control device; and
    selectively provide the particular data to the control device based on the other access level.

2. The device of claim 1, where the first authorization information includes device credentials for the control device.

3. The device of claim 1, where the one or more processors are further to:
    receive the device hash value and the encrypted device hash value from a manufacturer of the device.

4. The device of claim 1, where the access information indicates a plurality of access level hash values and a plurality of encrypted access level hash values associated with a plurality of access levels, the plurality of encrypted access level hash values being encrypted versions of the plurality of access level hash values, and where the one or more processors are further to:
    send a fourth label including the plurality of encrypted access level hash values in a security field;
    receive the third label based on the fourth label, the third label including a decrypted access level hash value in the security field;
    determine the decrypted access level hash value matches an access level hash value included in the plurality of access level hash values;
    determine the access level based on the decrypted access level hash value matching the access level hash value; and
    where the one or more processors, when selectively providing the particular data, are to:
    selectively provide the particular data to the control device based on the access level.

5. The device of claim 1, where the one or more processors are further to:
    send a fourth label to the control device, the fourth label indicating a type of the particular data and restrictions on use of the particular data by the control device.

6. The device of claim 1, where the first label is an Internet of Things (IoT) label having a universal labeling scheme.

7. The device of claim 1, where the device hash value is based on information unique to the device.

8. A non-transitory computer-readable medium storing instructions, the instructions comprising:
    one or more instructions that, when executed by one or more processors, cause the one or more processors to:
    store a hash value and an encrypted hash value, the encrypted hash value being an encrypted version of the hash value;
    send a first label including the encrypted hash value;
    receive a second label from an administrative device based on sending the first label, the second label including a decrypted hash value;
    determine that the decrypted hash value matches the hash value;
    activate a mode that permits access of a device based on the decrypted hash value matching the hash value;
    receive access information from the administrative device after activating the mode, the access information indicating an access level, the access level being associated with particular data that is permitted to be read from the device, and the access information associating first authorization information and the access level;
    receive a third label and a request, to provide data, from a control device, the third label including second authorization information;
    determine the second authorization information does not match the first authorization information;
    send, based on determining that the second authorization information does not match the first authorization information, an authorization request to authenticate the control device to the administrative device, the authorization request including the second authorization information;
    receive a response from the administrative device indicating another access level for the control device; and
    selectively provide the particular data to the control device based on the other access level.

9. The non-transitory computer-readable medium of claim 8, where the one or more instructions, when executed by the one or more processors, further cause the one or more processors to:
provide an acknowledgment to the administrative device based on activating the mode.

10. The non-transitory computer-readable medium of claim 8, where the one or more instructions, when executed by the one or more processors, further cause the one or more processors to:
set up credentials for the administrative device after activating the mode,
the credentials including a username, a password, an administrative device identifier, a key, or a network address;
store the credentials based on setting up the credentials; and
permit access for the administrative device to a smart device based on the credentials.

11. The non-transitory computer-readable medium of claim 8, where the one or more instructions, when executed by the one or more processors, further cause the one or more processors to:
activate access to an application layer of a smart device to permit a plurality of devices to access a plurality of application resources stored by the smart device based on activating the mode.

12. The non-transitory computer-readable medium of claim 8, where the first authorization information includes device credentials, access level hash values, or encrypted access level hash values.

13. The non-transitory computer-readable medium of claim 8, where the one or more instructions, when executed by the one or more processors, further cause the one or more processors to:
receive the hash value and the encrypted hash value from a manufacturer of the device.

14. The non-transitory computer-readable medium of claim 8, where the one or more instructions, that cause the one or more processors to selectively provide the particular data to the control device, cause the one or more processors to:
selectively provide the particular data and a fourth label to the control device, the particular data to be associated with a realm based on the fourth label.

15. A method, comprising:
storing, by a device, a hash value and an encrypted hash value, the encrypted hash value being an encrypted version of the hash value;
sending, by the device, a first label including the encrypted hash value;
receiving, by the device, a second label from an administrative device based on sending the first label, the second label including a decrypted hash value;
determining, by the device, whether the decrypted hash value matches the hash value;
activating, by the device, a mode that permits access of the device based on the decrypted hash value matching the device hash value;
receiving, by the device, access information from the administrative device after activating the mode, the access information associating first authorization information and an access level; receive a third label and a request, to provide data, from a control device, the third label including second authorization information;
determine the second authorization information does not match the first authorization information;
send, based on determining that the second authorization information does not match the first authorization information, an authorization request to authenticate the control device to the administrative device, the authorization request including the second authorization information;
receive a response from the administrative device indicating another access level for the control device; and
selectively providing, by the device, particular data to the control device based on the other access level, the particular data being permitted to be read from the device.

16. The method of claim 15, where the access information indicates a plurality of access level hash values and a plurality of encrypted access level hash values associated with a plurality of access levels,
the plurality of encrypted access level hash values being encrypted versions of the plurality of access level hash values, and
the method further comprising: sending a fourth label including the plurality of encrypted access level hash values in a security field;
receiving the third label based on the fourth label, the third label including a decrypted access level hash value in the security field;
determining the decrypted access level hash value matches an access level hash value included in the plurality of access level hash values;
determining the access level based on the decrypted access level hash value matching the access level hash value, the access level being associated with the particular data; and
where selectively providing the particular data comprises:
selectively providing the particular data to the control device based on the access level.

17. The method of claim 15, further comprising:
providing a fourth label to the control device, the fourth label indicating a type of the particular data and restrictions on use of the particular data by the control device.

18. The method of claim 15, further comprising:
providing an acknowledgment to the administrative device based on activating the mode.

19. The method of claim 15, further comprising:
setting up credentials with the administrative device for the administrative device after activating the mode,
the credentials including a username, a password, an administrative device identifier, a key, or a network address;
storing the credentials based on setting up the credentials; and
permitting access for the administrative device to a smart device based on the credentials.

20. The method of claim 15, where selectively providing the particular data to the control device comprises:
selectively providing the particular data and a fourth label to the control device, the particular data to be associated with a realm based on the fourth label.

* * * * *